United States Patent [19]
Jacquin et al.

[11] 4,334,982
[45] Jun. 15, 1982

[54] PROCESS FOR THE SELECTIVE DESULFURIZATION OF OLEFINIC CUTS

[75] Inventors: Yves Jacquin, Sevres; Jean-François Le Page, Rueil Malmaison, both of France

[73] Assignee: Institut Francais du Petrole, Rueil Malmaison, France

[21] Appl. No.: 152,215

[22] Filed: May 21, 1980

[30] Foreign Application Priority Data

May 21, 1979 [FR] France .................. 79 13067

[51] Int. Cl.$^3$ ............................................. C10G 23/02
[52] U.S. Cl. ................................. 208/216 R; 252/458; 252/465; 252/470
[58] Field of Search ................................. 208/216 R

[56] References Cited

U.S. PATENT DOCUMENTS

| | | | |
|---|---|---|---|
| 2,793,170 | 5/1957 | Stiles et al. | 208/216 R |
| 3,891,541 | 6/1975 | Oleck et al. | 208/89 |
| 4,013,637 | 3/1977 | Eberly, Jr. | 208/216 R |
| 4,080,286 | 3/1978 | Yanik et al. | 208/216 R |
| 4,081,408 | 3/1978 | Fischer et al. | 208/216 R |
| 4,083,771 | 4/1978 | O'Hara | 208/216 R |
| 4,098,682 | 7/1978 | O'Hara | 208/216 R |
| 4,203,828 | 5/1980 | Bodnick et al. | 208/213 |

Primary Examiner—O. R. Vertiz
Assistant Examiner—Wayne A. Langel
Attorney, Agent, or Firm—Millen & White

[57] ABSTRACT

Hydrocarbon cuts of high olefin content are desulfurized, without substantial loss in octane number, by reaction with hydrogen in the presence of a catalyst comprising (a) a specified non-acidic carried and (b) cobalt and at least one of tungsten and molybdenum, the atomic ratio $$R = \frac{\text{cobalt}}{\text{cobalt} + (\text{molybdenum and/or tungsten})}$$

being higher than 0.55.

18 Claims, No Drawings

PROCESS FOR THE SELECTIVE DESULFURIZATION OF OLEFINIC CUTS

BACKGROUND OF THE INVENTION

The present invention has for object a process and a group of catalysts for hydrodesulfurizing hydrocarbon cuts of high olefin content (15 to 45% of olefins by weight), this hydrodesulfurization taking place with a minimum hydrogenation of these olefins, so as to avoid as much as possible a loss in octane number when the hydrocarbon cut consists of gasoline.

Certain gasolines obtained by catalytic cracking may have, even after extraction or chemical removal of the mercaptans, a too high content of non-acidic sulfur compounds to satisfy the market requirements. This is the case for the catalytic cracking gasolines obtained from vacuum distillates or deasphalted residues of high sulfur content. In that case, the resultant gasolines have a high content, not only of mercaptans, but also of non-acidic sulfur compounds of the sulfide, di-sulfide, thiophene and alkyl thiophene type, which must be at least partly removed without concomitently decreasing the desired octane rating for the resultant fuel.

The conventional hydrodesulfurization catalysts comprising metals and/or sulfides of metals from the groups VIII and VI B of the periodical classification, which have always been used in an atomic ratio (R) such that $R = VIII/VI\ B + VIII$ is about 0.25 or lower than 0.5, are known as very active for hydrogenating olefins.

SUMMARY OF THE INVENTION

It has however been surprisingly found that catalysts of the above groups, comprising cobalt and at least one metal selected from the group consisting of molybdenum and tungsten, and comprising for example the cobalt-molybdenum and cobalt-tungsten pairs, can desulfurize efficiently a catalytic cracking effluent, without hydrogenating substantially the olefins present in this effluent, provided the above ratio (R)

$$R = \frac{\text{cobalt}}{\text{cobalt} + (\text{molybdenum and/or tungsten})}$$

is higher than 0.55.

DETAILED DISCUSSION

The ratio (R) is preferably in the range from 0.6 to 0.9 and more particularly in the range from 0.7 to 0.8. On the other hand, in order to avoid parasitic polymerization of the olefins through a mechanism of the carbonium ion type (which polymerization would be detrimental to the stability of the catalyst), it is necessary, when manufacturing the catalyst, to deposit the cobalt and molybdenum compounds or the cobalt and tungsten compounds onto a non-acidic carrier; the carriers will then be selected essentially from the group consisting of silica, aluminas of low specific surface (specific surface lower than 70 m²/g resulting, when the catalyst has been prepared, in an alumina based catalyst having a specific surface lower than 70 m²/g) of the α-alumina or tetragonal γ-alumina type (obtained for example, by heating cubic γ-alumina in an autoclave) or carriers of the cobalt, nickel, barium, magnesium or calcium aluminate type, these carriers of the aluminate type having a specific surface lower than 130 m²/g, so that the resultant catalyst has a specific surface lower than 130 m²/g (the preferred aluminate is calcium aluminate), or again selected from aluminas previously heated in an autoclave and whose specific surface is lower than 135 m²/g. The total content, expressed by weight, of the oxides of metals selected from the group consisting of cobalt, molybdenum and tungsten (i.e. the metals deposited on the carrier, and sometimes also present within the carrier, when using, for example, cobalt aluminate) is between 2 and 30% and preferably between 8 and 25%, the ratio R being higher than 0.55, preferably between 0.6 and 0.9 and more particularly between 0.7 and 0.8 (this atomic ratio is calculated in atoms of cobalt, tungsten or molybdenum metal element); these amounts of cobalt, molybdenum and/or tungsten concerning the metals deposited on the carrier and, if any, those which may be present in the carrier, for example, cobalt when a cobalt aluminate carrier is used). The process thus avoids substantially decreasing the octane number of the catalytic cracking effluent and decreasing the initial bromine number of this effluent by more than 10% and even 8%.

The feedstocks which are used in the process of the invention boil at least in major part in the gasoline range, for example below about 210° C. or below 200° C., sometimes below 170° C., depending on the expected use for these cuts.

The catalysts may be prepared by the various methods disclosed in the prior art, for example, either by impregnating the carrier with a volume of salt solution of the selected metals (molybdenum, cobalt, tungsten) equal to the pore volume, or by mixing the selected carrier precursor, alumina powder or silica salt or aluminate (for example, calcium aluminate), with selected salts of the active agents and extruding the resultant paste. Among the cobalt, molybdenum and tungsten salts, soluble salts of these metals may be mentioned: the nitrate, sulfate or acetate of cobalt, ammonium heptamolybdate or ammonium paratungstate of molybdenum and tungsten respectively. The impregnation may be effected in one or two steps; in the case of two impregnations, the latter are separated with drying and calcining; if the catalyst is prepared by mixing, and then extruding, the precursors of the active agents may be the above salts, or the oxides in the case of molybdenum and tungsten. After the impregnation or extrusion step, the catalysts are dried at a temperature of, for example, 100° to 150° C., and then calcined at, for example, 500° C. in an air stream.

Before use, the catalyst is preferably sulfided at a temperature about 20° to 60° C. higher than the selected reaction temperature (preferably about 30° to 50° C. higher) for a few hours by means of a mixture of hydrogen sulfide diluted in hydrogen (proportion of hydrogen sulfide in hydrogen: 0.5 to 5% by volume) at an adequate space velocity of, for example, about 1000 to 3000 (liters of gas at normal temperature and pressure per liter of catalyst per hour). The resultant catalyst comprises between about 0.5 and 25% of cobalt sulfide (usually in the form of $Co_9S_8$) and about 0.5 to 25% of molybdenum or tungsten sulfide (usually as $MoS_2$ or $WS_2$).

For treating olefinic gasolines containing sulfur and obtained from a catalytic cracking operation, the catalyst (which appears, for example, as extrudates or balls of an average equivalent diameter between about 1.5 and 6 mm) is preferably used as a fixed bed in a reactor providing a concentration gradient. The hydrotreatment is performed at a temperature of from about 260° to 310° C.; the pressure to be applied is usually between about 10 and 60 bars and preferably between 20 and 40 bars; the space velocity, expressed as m³ of injected charge per m³ of catalyst per hour is usually between about 2 and 15 and preferably between about 4 and 8; the hydrogen partial pressure is usually between about 5 and 50 bars and preferably between 10 and 40 bars. At the reactor outlet, the reaction mixture is cooled, the hydrocarbon fraction distilling in the gasoline range is condensed and then separated from a gas fraction of high hydrogen content which is, at least partly, recycled to the reactor (recycle gas). Irrespective of the nature of the charge, which is selected among the catalytic cracking effluents, and which may have various sulfur contents, it is preferred that the hydrogen sulfide content of the recycle gas be not higher than 5000 parts per million by volume (5000 vpm) preferably not higher than 4000 vpm; at higher values, it is necessary to increase the rate of the purge or to remove by washing a portion of the hydrogen sulfide, so as to maintain the $H_2S$ content of the recycle gas below 5000 or preferably 4000 vpm. In the possible case where the charge subjected to hydrodesulfurization has a very low sulfur content (S>50 ppm), it is conversely necessary to reduce the purge rate, so as to maintain a hydrogen sulfide content of the recycle gas higher than 150 vpm, preferably higher than 200 vpm, so as to increase the selectivity of the catalyst system.

EXAMPLE 1

A catalyst is manufactured by impregnating alumina balls having a 0.5% b.w. content of $Na_2O$, a specific surface of 67 m²/g and a total pore volume of 0.57 cm³/g, according to the following procedure: 57 cm³ of a solution of cobalt nitrate and ammonium paratungstate are added to 100 g of alumina balls having a diameter between 3 and 4 mm, at such concentrations that the resultant catalyst contains 6.3% of $WO_3$ and 6.0% of CoO (by weight) after drying and calcining for 3 hours at 500° C. in an air stream of 25 l/hour. This catalyst is referred to as catalyst A. In this catalyst, R=0.75.

A second catalyst B is prepared from the same alumina as used in the above case; however two successive impregnations, separated by air-drying at 150° C. and air-calcining (25 l/h) at 350° C., are effected. The first impregnation concerns tungsten, the second one cobalt; in the two operations, the impregnations are performed without excess of solution, i.e. by using 57 cm³ of solution of the precursor salt for 100 g of alumina balls. After drying and a final calcination in the same conditions as with the catalyst A, there is obtained a catalyst containing 6.3% of tungsten oxide $WO_3$ and 6.0% of cobalt oxide CoO (by weight). In this catalyst, R=0.75.

A third catalyst C is prepared from the same alumina as used for preparing catalyst A and according to the same operating technique; however, the impregnation solution now contains ammonium heptamolybdate and cobalt nitrate in such proportions that, after drying and calcining, the catalyst contains 4.4% of molybdenum oxide $MoO_3$ and 7% of cobalt oxide CoO. In the catalyst C, R=0.75.

Three other catalysts D, E, F are prepared by the method used for the catalysts A and C; but with a different carrier consisting of silica having a specific surface of 150 m²/g, for catalysts D and E, and a calcium aluminate of the SECAR cement type having a specific surface of 45 m²/g, for catalyst F. The specifications of the resultant catalysts are given in the Table I. R=0.75 for the catalysts D, E and F.

Two catalysts G and H are also prepared with the same alumina carrier as used when preparing the catalyst A and according to the same procedure; however the concentrations of the precursor salts are so adjusted that the atomic ratio R is now 0.325.

Two catalysts I and II' are finally prepared from γ cubic alumina having a surface of 205 m²/g (boehmite), by a method comprising only one impregnation and by adjusting the precursor salts of cobalt and molybdenum so as to obtain a ratio R of 0.75 for the final catalyst I' and 0.325 for the final catalyst I.

TABLE I

Specifications of the catalysts employed

| SPECIFICATIONS of THE RESULTANT CATALYSTS | NATURE of THE CARRIER | | | | | | | | | |
|---|---|---|---|---|---|---|---|---|---|---|
| | A | B | C | D | E | F | G | H | I | I' |
| | TETRAGONAL γ-ALUMINA WITH 0.5% b.w. $Na_2O$ | | | SILICA | | SECAR ** | TETRAGONAL γ-ALUMINA OF LOW SURFACE (0.5% $Na_2O$) | | PURE ALUMINA OF HIGH SURFACE EX. BOEHMITE | |
| Total pore volume (cm³/g) | 0.53 | 0.53 | 0.53 | 0.81 | 0.8 | 0.41 | 0.53 | 0.53 | 0.57 | 0.57 |
| Specific surface (m²/g) | 62 | 62 | 62 | 143 | 137 | 43 | 62 | 62 | 183 | 183 |
| Cobalt (% oxide b.w.) | 6.0 | 6.0 | 7 | 7.0 | 6.0 | 7.0 | 3 | 2.5 | 3 | 7.0 |
| Molybdenum (% oxide b.w) | 0 | 0 | 4.4 | 4.4 | 0 | 4.4 | 12 | 0 | 12 | 4.0 |
| Tungsten (% oxide b.w.) | 6.3 | 6.3 | 0 | 0 | 6.3 | 0 | 0 | 17.6 | 0 | 0 |

**Calcium aluminate (SECAR cement).

EXAMPLE 2

Catalytic cracking gasoline whose specifications are given below is treated with hydrogen:

| Distillation ASTM | |
|---|---|
| Initial point (°C.) | 40 |
| 50% point (°C.) | 92 |
| Final point (°C.) | 190 |
| Volumic mass (g/ml) | 0.734 |
| Bromine number | 39 |
| Olefins % b.w. | 19.4 |
| Sulfur % b.w. | 0.08 |
| Research octane number | 92 |

Before starting the treatment, the catalysts are pre-sulfided at 320° C. under a pressure of 4 bars for 4 hours with a gas mixture of hydrogen sulfide (2% by volume) diluted in hydrogen. The space velocity in the pre-sulfiding step is 2000 (in liters of gas at normal temperature and pressure per liter of catalyst per hour). After the pre-sulfiding step, the temperature is decreased to the value selected for the hydrodesulfurization operation, and the charge is supplied to the reaction zone. After pre-sulfiding, the sulfur content of the catalysts is 4.5% by weight.

The operating conditions, as defined in Table II are the same for all the catalysts. The results obtained after 120 hours of test are also reported in Table II. It is observed that the catalysts A, B, C, D, E and F, although exhibiting different levels of activity with respect to the hydrodesulfurization and the hydrogenation of the olefins, are however much more selective than the catalysts G, H and I (wherein the contents of metals from the groups VIII and VI B are in the atomic ratio of R=0.325) or than the catalyst I' which has a satisfactory R ratio but whose carrier has a too high specific surface. The too high hydrogenation activity of the catalysts G, H and I must also be noted.

EXAMPLE 3

The catalytic cracking gasoline whose specifications are given in the example 2 is treated with hydrogen, but the operation is continued for 650 hours to demonstrate the stability of the operation. The results are given in Table IV. It is observed that the catalysts A, B, C are more stable than the catalysts G and H whose ratio R is 0.325, which are themselves more stable than the catalyst I whose ratio R is also 0.325, but which is prepared from an alumina of large surface and of a far greater acidity than the aluminous carrier of low surface used for manufacturing the catalysts A, B, C, G and H.

The results obtained with a too high H$_2$S content of the recycle gas (6,000 vpm) are given in Table V.

TABLE IV

| Operating conditions: | | | P = 40 bars<br>T = 280° C. | | | Space velocity = 5<br>H$_2$S in the recycle gas = 2000 vpm | | | | | | H$_2$/HC = 150 l/l | | |
|---|---|---|---|---|---|---|---|---|---|---|---|---|---|---|
| CATALYSTS | A | | | B | | | C | | | G | | | H | | I |
| Cycle time (hours) | 120-340-650 | | | 120-340-650 | | | 120-340-650 | | | 120-340-650 | | | 120-340-650 | | 120-340-650 |
| S (ppm) | 240 | 263 | 251 | 200 | 207 | 213 | 30 | 37 | 38 | 5 | 11 | 15 | 10 | 13 | 20 | 5 | 17 | 23 |
| Bromine number | 37 | 37.5 | 37 | 36.5 | 36.5 | 36 | 35 | 34.5 | 35.5 | 11 | 14 | 16 | 8 | 12 | 14 | 0.2 | 3 | 11 |
| O.N. research | 92 | 92 | 92 | 92 | 92 | 91.5 | 91.5 | 91 | 91.5 | 87 | 87.5 | 87.5 | 86 | 87 | 87 | 83 | 83 | 86 |

TABLE II

| Operating conditions: | T = 280° C.<br>Space velocity = 5<br>H$_2$S in the recycle gas: 2000 vpm | | | | | | P = 40 bars<br>H$_2$/HC (l/l) = 150 | | | |
|---|---|---|---|---|---|---|---|---|---|---|

Results after 120 hours of test.

| | CATALYST | | | | | | | | | |
|---|---|---|---|---|---|---|---|---|---|---|
| PRODUCT | A | B | C | D | E | F | G | H | I | I' |
| % sulfur | 0.024 | 0.02 | 0.003 | 0.005 | 0.027 | 0.006 | 0.0005 | 0.001 | 0.0005<br>(= 5 ppm) | 0.0012 |
| Bromine number | 37 | 36.5 | 35 | 36 | 37.5 | 37 | 11 | 8 | 0.2 | 33.9 |
| O.N. research | 92 | 92 | 91.5 | 91.5 | 92.5 | 92 | 87 | 86 | 83 | 89.2 |

The charge treatment with the catalysts G, H and I is repeated, but the operating conditions are adapted to decrease the hydrogenation rate. The selected operating conditions are as follows:

| T = 270° C. | VVH = 10 | H$_2$S in the recycle gas = |
| P = 40 bars | H$_2$/HC = 150 l/l | 2000 vpm |

The following results, reported in Table III, are obtained after 120 hours of test.

TABLE III

| | CATALYSTS | | |
|---|---|---|---|
| PRODUCTS | I | G | H |
| % sulfur | 0.0084 | 0.0084 | 0.0113 |
| Bromine number | 5 | 23 | 21 |
| O.N. research clear | 85 | 90 | 89.5 |

These results show that, in spite of the modified operating conditions, the selectivities obtained with the catalysts G, H and I are still far lower than those achieved with the catalysts A, B, C, D, E and F, as concerns the decrease of the octane number in the course of the treatment; in other words, the results reported in Table III show that a conventional catalyst (with a ratio R not conforming with the invention), when used under milder conditions as in the prior art, cannot yield as satisfactory a (desulfurization/hydrogenation) ratio as the catalysts of the present invention, themselves used in these mild conditions.

TABLE V

| Same operating conditions as in Table IV, except<br>H$_2$S content of the recycle gas: 6000 vpm. | | | |
|---|---|---|---|
| CATALYSTS | A | B | C |
| Cycle time (hours) | 650 | 650 | 650 |
| S (ppm) | 480 | 380 | 70 |
| Bromine number | 38.5 | 38 | 36.5 |
| O.N. research | 92 | 92 | 92 |

What is claimed is:

1. A process for the catalytic hydrodesulfurization of a catalytic cracking effluent boiling at least in major part in the gasoline range and containing 15 to 45% by weight of olefins, without substantial decrease in the octane number of said effluent, and without decreasing the bromine number of said effluent by more than 10%, said process comprising contacting said effluent, in the presence of hydrogen, at a temperature between about 260° and 310° C., with a catalyst comprising (a) a non-acidic carrier, and (b) cobalt and at least one of tungsten and molybdenum; wherein the total weight of cobalt, tungsten and molybdenum in said catalyst, expressed as oxides, is from 2 to 30% of the total catalyst weight; and wherein the atomic ratio $$R = \frac{\text{cobalt}}{\text{cobalt + molybdenum and/or tungsten}}$$

is higher than 0.55; and recovering an effluent having a lower sulfur content, substantially the same octane number and at most a 10% reduction in bromine number.

2. A process according to claim 1, wherein said catalyst contains, by weight, 8 to 25% of cobalt and tungsten oxides or 8 to 25% of cobalt and molybdenum oxides, the atomic ratio R being from 0.6 to 0.9.

3. A process according to claim 2, wherein the catalyst contains cobalt and tungsten.

4. A process according to claim 2, wherein the catalyst contains cobalt and molybdenum.

5. A process according to claim 1, wherein the catalyst carrier is an aluminate of a metal, said metal being cobalt, nickel, barium, magnesium or calcium, wherein said carrier has a specific surface lower than 130 m$^2$/g, and wherein the specific surface of the finished catalyst is lower than 130 m$^2$/g.

6. A process according to claim 5, wherein said carrier is calcium aluminate.

7. A process according to claim 1, which further comprises cooling and partially condensing the hydrodesulfurization reaction effluent, and separately recovering a hydrocarbon fraction distilling in the gasoline range, and a gas fraction of high hydrogen content, said gas fraction being at least partly recycled to the reaction zone, the recycled portion of the fraction of high hydrogen content containing 150 to 5000 parts per million by volume of hydrogen sulfide.

8. A process according to claim 7, wherein the recycled portion of the fraction of high hydrogen content contains 200 to 4000 parts per million by volume of hydrogen sulfide.

9. A process according to claim 1, wherein said contacting is effected at a pressure of 10-60 bars.

10. A process according to claim 9, wherein said pressure is 20-40 bars.

11. A process according to claim 1, wherein said contacting is effected at a space velocity of 2-15 m$^3$ of charge per m$^3$ of catalyst per hour.

12. A process according to claim 11, wherein said space velocity is 4-8 m$^3$ of charge per m$^3$ of catalyst per hour.

13. A process according to claim 1, wherein said contacting is effected at a hydrogen partial pressure of 5-50 bars.

14. A process according to claim 13, wherein said hydrogen partial pressure is 10-40 bars.

15. A process according to claim 1 wherein the catalyst carrier is alumina and the specific surface of the catalyst is lower than 70 m$^2$/g.

16. A process according to claim 1, wherein the ratio R is between about 0.7 and 0.8.

17. A process according to claim 1, wherein said catalyst carrier is an alumina heated in an autoclave and having a specific surface lower than 135 m$^2$/g.

18. A process according to claim 1, wherein the catalyst is sulfided.

* * * * *